United States Patent
Xing et al.

(10) Patent No.: US 12,072,955 B2
(45) Date of Patent: Aug. 27, 2024

(54) PARAMETER UTILIZATION FOR LANGUAGE PRE-TRAINING

(71) Applicant: salesforce.com, inc., San Francisco, CA (US)

(72) Inventors: Chen Xing, Singapore (SG); Wenhao Liu, Redwood City, CA (US); Chu Hong Hoi, Singapore (SG); Nitish Shirish Keskar, San Francisco, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 450 days.

(21) Appl. No.: 17/532,851

(22) Filed: Nov. 22, 2021

(65) Prior Publication Data

US 2022/0391640 A1 Dec. 8, 2022

Related U.S. Application Data

(60) Provisional application No. 63/194,141, filed on May 27, 2021.

(51) Int. Cl.
*G06F 18/214* (2023.01)
*G06F 18/21* (2023.01)
*G06F 40/00* (2020.01)

(52) U.S. Cl.
CPC ...... *G06F 18/2148* (2023.01); *G06F 18/2163* (2023.01); *G06F 40/00* (2020.01)

(58) Field of Classification Search
CPC .. G06F 40/00; G06F 18/2148; G06F 18/2163; G06F 18/253; G06F 40/20;
(Continued)

(56) References Cited

U.S. PATENT DOCUMENTS

| 9,563,854 B2 * | 2/2017 | Cruz Mota | ........... G06F 21/577 |
| 10,740,433 B2 * | 8/2020 | Dehghani | ............... G06F 17/14 |

(Continued)

OTHER PUBLICATIONS

Devlin et al. "Bert: Pre-training of deep bidirectional transformers for language understanding." arXiv preprint arXiv:1810.04805, 2018.
(Continued)

*Primary Examiner* — Negussie Worku
(74) *Attorney, Agent, or Firm* — Haynes and Boone, LLP

(57) ABSTRACT

Embodiments are directed to pre-training a transformer model using more parameters for sophisticated patterns (PSP++). The transformer model is divided into a held-out model and a main model. A forward pass and a backward pass are performed on the held-out model, where the forward pass determines self-attention hidden states of the held-out model and the backward pass determines loss of the held-out model. A forward pass on the main model is performed to determine a self-attention hidden states of the main model. The self-attention hidden states of the main model are concatenated with the self-attention hidden states of the held-out model. A backward pass is performed on the main model to determine a loss of the main model. The parameters of the held-out model are updated to reflect the loss of the held-out model and parameters of the main model are updated to reflect the loss of the main model.

20 Claims, 8 Drawing Sheets

(58) Field of Classification Search
CPC ...... G06N 3/045; G06N 3/0464; G06N 3/048; G06N 3/084
USPC .......................................................... 382/159
See application file for complete search history.

(56) References Cited

U.S. PATENT DOCUMENTS

| | | | |
|---|---|---|---|
| 11,922,305 B2* | 3/2024 | Ramachandran | G06N 3/08 |
| 2021/0150340 A1* | 5/2021 | Liu | G06N 3/045 |
| 2022/0129626 A1* | 4/2022 | Liu | G06F 40/20 |
| 2023/0042327 A1* | 2/2023 | Liu | G06N 3/082 |
| 2023/0419027 A1* | 12/2023 | Pang | G06F 40/20 |

OTHER PUBLICATIONS

Clark et al. "Electra: Pre-training text encoders as discriminators rather than generators." In International Conference on Learning Representations, 2019.

He et al. "Deep residual learning for image recognition." In Proceedings of the IEEE conference on computer vision and pattern recognition, pp. 770-778, 2016.

Ba et al. "Layer normalization." arXiv preprint arXiv:1607.06450, 2016.

Vaswani et al. "Attention is all you need." In Advances in neural information processing systems, pp. 5998-6008, 2017.

* cited by examiner

|  | Params | MNLI Acc | GLUE Avg. | SuperGLUE Avg. | SQuAD2.0 F1 | EM |
|---|---|---|---|---|---|---|
| GPT-2 | 117 M | - | 78.8 | - | - | - |
| BERT | 110 M | - | 82.2 | 66.1 | 76.4 | 79.6 |
| SpanBERT | 110 M | 84.0 | 83.9 | - | 77.1 | 80.3 |
| ELECTRA | 110 M | 86.3 | 85.1 | - | 80.5 | 83.3 |
| BERT (Ours) | 110 M | 84.9 | 83.3 | 68.1 | 75.8 | 78.3 |
| BERT-PSP++ | 86 M | 85.3 | 84.0 | 69.5 | 77.7 | 80.2 |
| ELECTRA (Ours) | 110 M | 86.9 | 85.7 | 70.6 | 80.7 | 83.8 |
| ELECTRA-PSP++ | 102 M | 87.1 | 86.1 | 71.6 | 83.2 | 86.9 |

500

*FIG. 5*

PARAMETER UTILIZATION FOR LANGUAGE PRE-TRAINING

CROSS REFERENCES

The instant application is a nonprovisional of and claims priority under 35 U.S.C. § 119 to commonly-owned U.S. provisional application No. 63/194,141, filed May 27, 2021, which is hereby expressly incorporated by reference herein in its entirety.

TECHNICAL FIELD

The disclosure relates generally to training language models, and more specifically to training transformer models using parameters for sophisticated patterns.

BACKGROUND

Language pre-training methods with transformer models are effective on various natural language processing (NLP) downstream tasks. In language model pre-training, larger models appear to perform better. The empirical evidence shows that the challenge in language pre-training is not overfitting but fitting data. For example, models with billions of parameters do not overfit to normal pre-training corpora. Further, when overfitting is a concern, larger models start to converge slower (with respect to the test error), which is not the case in language model pre-training. In language model pre-training, larger models converge faster with respect to the test error. One way to alleviate underfitting is to increase the parameter size of the models to fit training data. However, this approach is not sustainable or practical for many institutions and real-world scenarios. This is because the computational cost can be unacceptable when the parameter size is large.

Given a fixed model size, data fitting may be improved for language pre-training via better model parameter utilization. Conventionally, different patterns in training data may be fitted at different phases of training. The deep learning optimization literature illustrates that models learn simple and common patterns first. In language pre-training specifically, probing research suggests that compared with human commonsense and reasoning, linguistic and syntactic patterns are easier for the model to fit, and therefore are learned at the early phase of pre-training. Smaller pre-trained models can also perform similarly in linguistics-focused downstream tasks with the larger models. The smaller pre-trained models, however, fall behind with a large margin on semantics-focused tasks. However, as empirically observed in continual learning, the patterns fitted first are typically heavily over-parameterized. In other words, the simple patterns fitted first by the model, such as linguistics and syntax in language data, would occupy much more model parameters than they may need. This may make harder for the model to fit the more sophisticated patterns in training data, such as human commonsense and reasoning information, which are found to be more important for the performance of pre-trained models on downstream NLP tasks.

BRIEF DESCRIPTION OF THE DRAWINGS

FIG. 5 is a table of performances of PSP++ compared to baseline methods.

Figure 1:
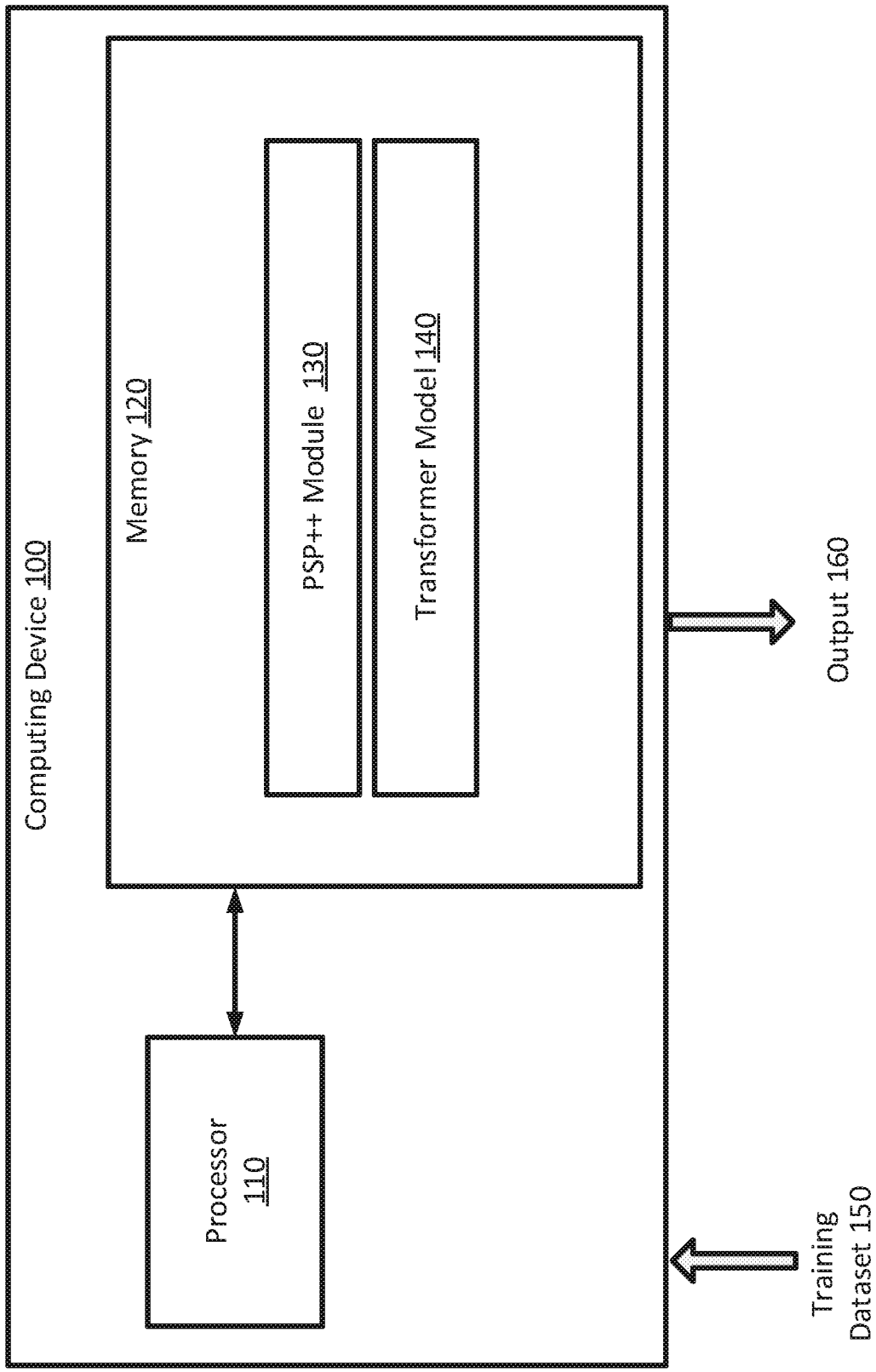
FIG. 1 is a simplified diagram of a computing device using parameters for sophisticated patterns (PSP++) module to train a neural network model, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The embodiments are directed to a parameters for sophisticated patterns module or PSP++ module. The PSP++ module uses a method for training a neural network model where a subset (e.g., a relatively smaller subset) of model parameters may be assigned to fit the "easy-to-fit" information. The rest of the model parameters may then be used to fit harder and more important information. In this way, the data fitting for pre-training models may be more efficient and effective.

In some embodiments, the PSP++ module divides the neural network model, such as a transformer model into a main model and a held-out model. The PSP++ module holds out a small subset of model parameters for "easy-to-fit" patterns in the held-out model in parallel with training the main model. For example, when training the main model, the PSP++ module holds the small subset of model parameters such as w self-attention heads from h lower layers and trains the small subset of parameters separately with another mask language modeling (MLM) loss in parallel with training the main model. The PSP++ module updates the held-out model parameters with their own loss such as a masked language model (MLM) loss instead of the loss function of the main model. Since the held-out model's parameter size is small compared to the main model, the held-out model may capture the "easy-to-fit" information from training data because it lacks enough capacity to fit more sophisticated information. Then, in the forward pass of the main model, PSP++ module takes the information, which may be the easy patterns embedded in the held-out model, as extra input by concatenating the self-attention hidden states of the held-out model with those of the main model. In this way, the main model does not fit the easy patterns, and reserves the parameters in the main model for fitting the residual more sophisticated information in training data.

In some embodiments, the PSP++ module may be used to pre-train various models to evaluate their effectiveness. Example models may be BERT and ELECTRA based models. The models pre-trained with the PSP++ module consistently outperform models pre-trained using conventional methods on different datasets such as GLUE, SuperGLUE and SQuAD. Moreover, the PSP++ module has a better performance on more reasoning-focused tasks, such as MNLI, RTE in GLUE and WiC, BoolQ, SuperRTE WSC in SuperGLUE. Accordingly, by reserving more model parameters, more sophisticated patterns related to commonsense and reasoning can be better fitted. The PSP++ module also does not add extra training time complexity to its backbone methods since the held-out model and the main model are pre-trained in parallel. Therefore, the PSP++ module pre-training can train two or more models with different sizes at the same time. Results show that three models with parameter sizes a, b and c may be trained together in one round, with the same training time as training the 110M base model. Each of the three pre-trained models achieves comparable performance with pre-training it separately from scratch.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks, such as supervised or unsupervised neural networks, convolutional neural networks, or memory-augmented neural networks, among others.

FIG. 1 is a simplified diagram of a computing device 100 using parameters for sophisticated patterns (PSP++) module to train a neural network model, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include a non-transitory, tangible, machine readable media that includes executable code that when run by one or more processors (e.g., processor 110) may cause the one or more processors to perform the methods described in further detail herein. For example, as shown, memory 120 includes instructions for a PSP++ module 130 and transformer model 140. Transformer model 140 may be a language model, such as a BERT model or another transformer model. PSP++ module 130 may pre-train transformer model 140. Pre-training transformer model 140 may involve training parameters of transformer model 140 using a training dataset 150. Training dataset 150 may be a dataset for which input and output values are known. PSP++ module 130 pre-trains transformer model 140 using training dataset 150 until the output 160 of model 140 is within a margin of error from the expected output of training dataset 150.

Figure 2A:
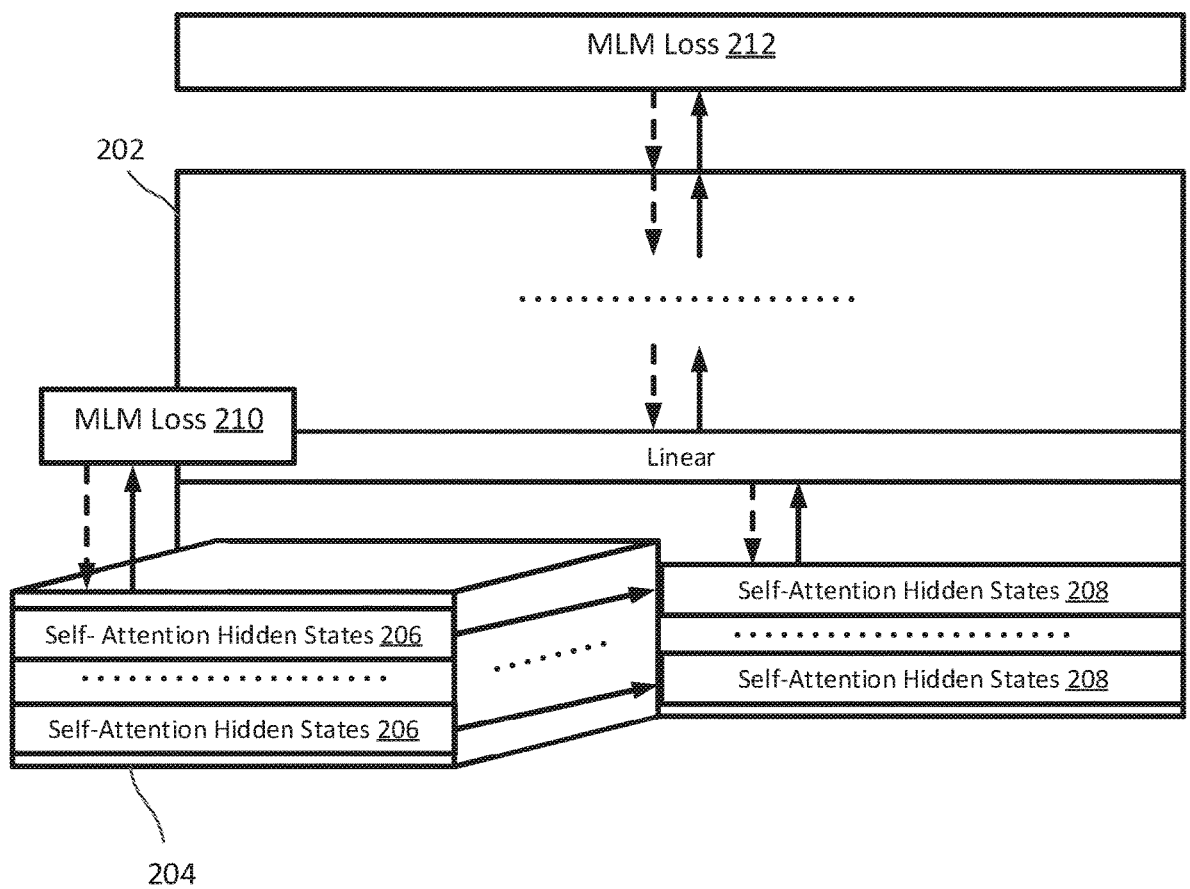
FIGS. 2A and 2B are block diagrams of the PSP++ module training a neural network model, according to some embodiments.

FIG. 2A is a diagram 200A that illustrates how the PSP++ module trains a model, according to some embodiments. Transformer model 140 may be divided into a main model 202 and a held-out model 204. The held-out model 204 may be included in a portion of a predefined number of lower layers from the transformer model 140. In some embodiments, held-out model 204 may share a number of lower layers in transformer model 140 with main model 202. The solid arrows in FIG. 2A represent the forward pass of the PSP++ module on transformer model 140 and the dotted arrows represent the backward pass. The held-out model 204 includes the parameters of the held-out model 204 which are separate from the parameters of the main model 202. The PSP++ model trains the main model 202 and the held-out model 204 separately with their own loss functions (illustrated here as MLM losses 210 and 212). The self-attention hidden states 206 of the held-out model 204 are concatenated with the self-attention hidden states 208 of the main model 202, to act as extra input to help train the main model 202. In this way, the main model 202 does not have to fit the easy-to-fit information captured by the held-out model 204, which reserves the rest of the model parameters to fit more sophisticated information.

As discussed above, the PSP++ module 130 trains transformer model 140. The architecture of transformer model 140 may be a transformer model, such as BERT (Bidirectional Encoder Representation from Transformers). BERT is a multi-layer bidirectional transformer encoder model, which takes the combination of semantic (token embeddings) and ordering information (positional embeddings) of a sequence of words as input. The output of BERT is a sequence of contextualized token representations of the same length.

In some embodiments, each transformer layer consists of a self-attention sub-layer and a position-wise feed-forward sub-layer, with a residual connection and layer normalization applied after every sub-layer. The self-attention sub-layer may be referred to as a scaled dot-product attention, which produces its output by calculating the scaled dot products of queries and keys as the coefficients of the values as follows:

$$a(q, K) = \frac{qK^T}{\sqrt{d}} \quad (1)$$

$$\text{Attention}(q, K, V) = \text{Softmax}(a(q, K))V. \quad (2)$$

where q (Query), K (Key), V (Value) are the hidden states outputs from the previous layer and d is the dimension of these hidden states. Among them, q is the hidden state vector for the query token, K and V are matrices each row of which is a hidden state vector for a key/value position, and a(q, K) may be K's attention weight vector with the dimension the same as the number of keys in K. Each transformer layer may further extend the self-attention layer described above to a multi-head version in order to jointly attend to information from different representation subspaces. The multi-head self-attention sub-layer works as follows:

$$\text{MultiHead}(q, K, V) = \text{Concat}(\text{head}_1, \ldots, \text{head}_H) W^O \quad (3)$$

$$\text{head}_k = \text{Attention}(qW_k^Q, KW_k^K, VW_k^V), \quad (4)$$

where $W_k^Q \in \mathbb{R}^{d \times d_K}$, $W_k^K \in \mathbb{R}^{d \times d_K}$, $W_k^V \in \mathbb{R}^{d \times d_V}$ are projection matrices, H may be the number of heads, and $d_K$ and $d_V$ are the dimensions of the key and value separately. After the self-attention sub-layer, a position-wise residual connection and layer normalization are applied. If the model's hidden states at the query position, q are used the residual connection and layer normalization may be calculated as:

$$q' = \text{LayerNorm}(q + \text{MultiHead}(q, K, V)) \quad (5)$$

Following equation (5), there is a position-wise feed-forward (FFN) sub-layer, which is a fully connected network applied to every position separately. The FFN sub-layer is usually a two-layer feed-forward network with a ReLU activation function in between. Given vectors $\{h_1, \ldots, h_n\}$, a position-wise FFN sub-layer transforms each $h_i$ as FFN $(h_i) = \sigma(h_i W_1 + b_1) W_2 + b_2$, where $W_1$, $W_2$, $b_1$ and $b_2$ are parameters. After this FFN sub-layer, the residual connection and layer normalization are applied as $h'_i = \text{LayerNorm}(h_i + \text{FFN}(h_i))$.

The PSP++ module 130 may employ transformer layers as building blocks for both the held-out model 204 and the main model 202. Modifications may be made to the self-attention layers of the main model 202 to enable accepting the held-out model 204's self-attention hidden states as extra inputs.

Figure 2B:
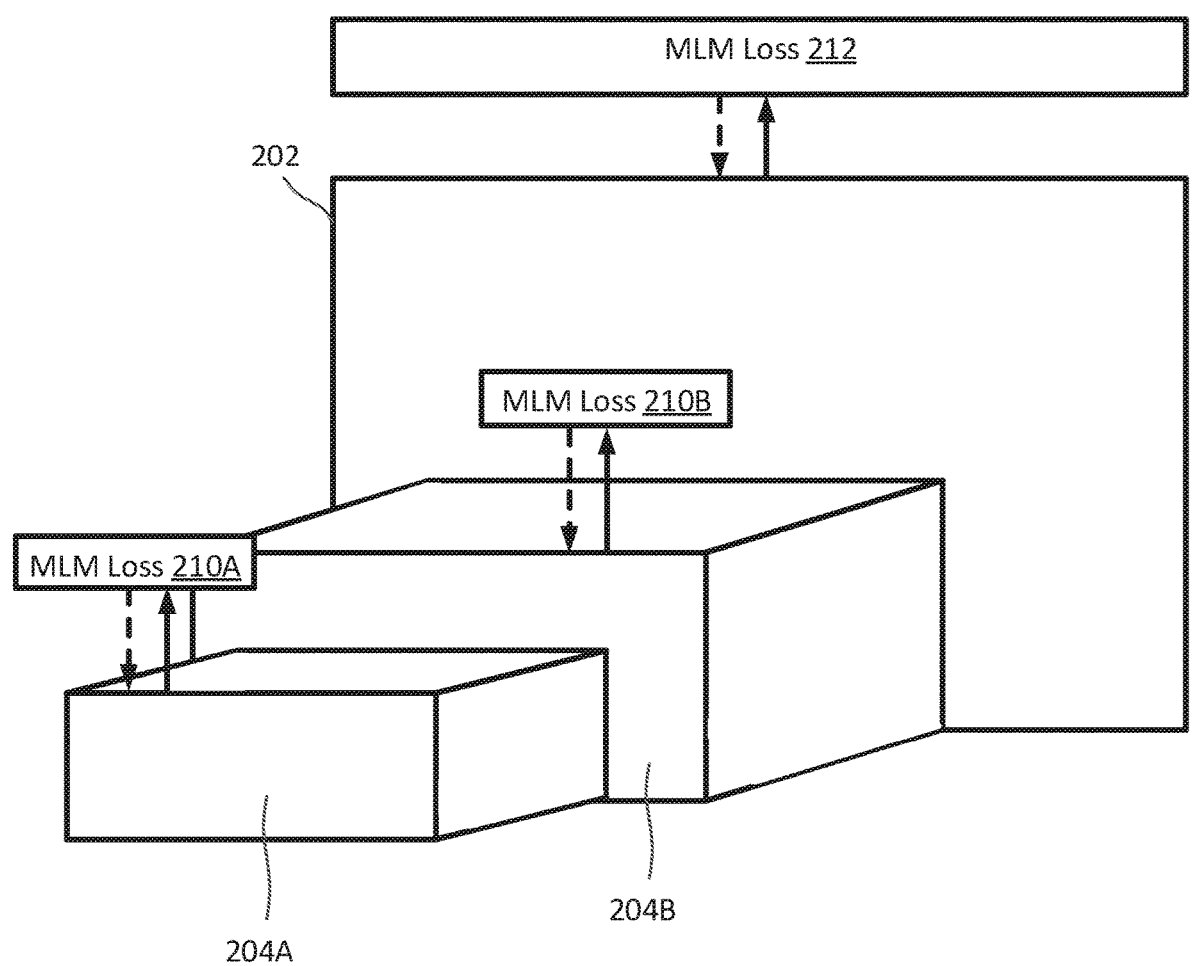

In some embodiments, PSP++ module 130 may train multiple held-out models of different sizes. FIG. 2B is a block diagram 200B that illustrates the PSP++ module training held-out models of different sizes, according to some embodiments. Example held-out models 204 that have different sizes, and hence different number of parameters, are held-out models 204A and 204B. By choosing the sizes of the held-out models 204, PSP++ module 130 may train multiple held-out models 204 with different sizes in one round, each of which can achieve comparable performance with pre-training the model separately from scratch. Each of the held-out models 204 may have their own associated loss (e.g., MLM loss 210A and MLM loss 210B) which are separate from the main model loss 212.

Going back to FIG. 2A, for ease of description, PSP++ module 130 may train one held-out model 204. The training may include the PSP++ module 130 performing a forward and backward pass on the held-out model 204 and a forward and backward pass on main model 202.

In some embodiments, as part of the forward and backward pass on the held-out model 204, PSP++ module 130 removes $w_s$ self-attention heads from each layer of $h_s$ lower layers of the main model 202 and replaces the self-attention heads with those of the held-out model 204. The held-out model 204 may be a standard transformer with $h_s$ transformer layers. A layer in $h_s$ transformer layers may have $w_s$ attention heads. The $h_s$ and $w_s$ are both smaller than the base model's number of layers h and number of self-attention heads w at each layer. PSP++ module 130 may perform an identical forward pass with held-out model 204 and main model 202.

In some embodiments, in one transformer layer of the held-out model 204, the PSP++ module 130 may calculate the self-attention hidden states of query $q_s$ as follows:

$$h_{(q,s)} = \text{MultiHead}_s(q_s, K_s, V_s) \quad (6)$$

$$= \text{Concat}(\text{head}_1, \ldots, \text{head}_{w_s}) W_s^O. \quad (7)$$

where $q_s$, $K_s$, and $V_s$ are hidden states from the held-out model 204's previous layer. If a dimension of the held-out model 204's hidden states is denoted as $d_s$, then $W_s^O \in \mathbb{R}^{d_s \times d_s}$. Every $\text{head}_i$ may be calculated according to Equation 4. The sizes of parameters in every individual attention head may be $W_k^Q \in \mathbb{R}^{d_s \times d_K}$, $W_k^K \in \mathbb{R}^{d_s \times d_K}$, $W_k^V \in \mathbb{R}^{d_s \times d_V}$. Further, $d_K$ and $d_V$ may be the same as those of the main model 202's attention heads, so that $h_{(q,s)}$ may be concatenated to the main model 202 without changing the main model 202's original hidden dimension. Further, $d_s$ may be equal to $d_V \times w_s$. The $h_{(q,s)}$ may be concatenated to the base model as an extra input. The concatenation is discussed below within the forward pass of the main model 202. The rest of the forward pass is the same as described above. $h_{(q,s)}$ will forward through the residual and layer norm layer, and then held-out model 204's FFN sub-layer, as described in FIG. 3.

In some embodiments, the backward pass of the held-out model 204 may also be independent from that of the main model 202. If the language pre-training loss function of the held-out model 204 is denoted as $\mathcal{L}_s$, and the parameters of the held-out model 204 are denoted as $W_s$, then $W_s$ may be updated with only $$\frac{\partial \mathcal{L}_s}{\partial W_s}.$$

In some embodiments, the PSP++ module 130 also performs the forward pass on the main model 202. If the total number of transformer layers in the main model 202 are h, then for the top $h - h_s$ layers, the forward pass is the same as original transformer layers. If the number of self-attention heads in these top layers are denoted w, the dimension of hidden states may be d. Since the top layers of the main model 202 do not interact with the held-out model 204, the top layers may receive the outputs from the previous layers (with information from both the held-out model 204 and the main model 202 embedded) and apply the normal forward pass.

The number of attention heads at each layer $w_m$ of the bottom $h_s$ layers of the main model 202 may be $w_m = w - w_s$. During the forward pass, for every query q, the main model 202's self-attention hidden states $h_{(q,m)}$ may be calculated. Next, the self-attention hidden states $h_{(q,m)}$ may be concatenated with the held-out model 204's self-attention hidden states $h_{(q,s)}$ at the corresponding layer. Specifically, in one of the bottom $h_s$ transformer layers, the main model 202's self-attention hidden states for a query position may be calculated as:

$$h_{(q,m)} = \text{MultiHead}_m(q_m, K_m V_m) \quad (8)$$

$$= \text{Concat}(\text{head}_1, \ldots, \text{head}_{w_m}) W_m^O. \quad (9)$$

where the $\text{MultiHead}_m$ is the multi-head attention function of the main model 202's transformer layer that has $w_m$ attention heads. The $q_m$, $K_m$ and $V_m$ are hidden states from the previous layer of the main model 202 with hidden dimension d. In an individual self-attention head $\text{head}_i$, the size of all parameters remains the same as those in Equation 4 since the input dimension remains the same as d. $W_m^O \in \mathbb{R}^{d_m \times d_m}$ in which $d_m = d - d_s$. $d_m$ also equals to $w_m \times d_V$, in which $d_V$ is the hidden dimension of every attention head that remains the same for both the held-out model 204 and the main model 202. Therefore, the size of $W_m^O$ is significantly smaller than the original $W^O$ of the top layers with size d×d.

After calculating the self-attention hidden states $h_{(q,m)}$ of main model 202, $h_{(q,m)}$ may be concatenated with the self-attention hidden states $h_{(q,s)}$ of the held-out model 204. The held-out model 204's corresponding self-attention hidden states of the same position of q in the input sequence may be:

$$h_{(q)} = \text{Concat}(h_{(q,m)}, h_{(q,s)}). \tag{10}$$

The dimension of $h_q$ is $d_s + d_m = d$, the same as the hidden size of the top transformer layers. After the concatenation, the residual connection and layer normalization are applied as follows:

$$q'_m = \text{LayerNorm}(q_m + h_q). \tag{11}$$

After the layer normalization, $q'_m$ goes through the FFN sub-layer of the main model 202 and then is an input to the upper transformer layer of the main model 202. This is illustrated in FIG. 3, described below.

In some embodiments, the PSP++ module 130 performs the backward pass on the main model 202. The loss of the main model may be denoted as $\mathcal{L}_m$. During training, the parameters in the main model 202 may be updated with respect to $\mathcal{L}_m$. The loss $\mathcal{L}_s$ of the held-out model 204 may not be back-propagated into main model 202. Similarly, the loss $\mathcal{L}_m$ of the main model may not be back-propagated to the held-out model 204. The self-attention hidden states $h_{q,s}$ of the held-out model 204 may act as extra input at the lower layers of the main model 202 to help pre-training. In this way, the easy-to-fix patterns in the training set learned by the held-out model 204 are "locked" in the held-out model 204, because the backward pass of the two model parts are independent. Therefore, the easy patterns learned in the held-out model 204 may act as extra inputs of the main model 202. With such input, the parameters of the main model 202 whose size is significantly larger than the held-out model 204 may focus on learning the residual semantic information left in the data which are more important for the model's performance on downstream tasks.

Figure 3:
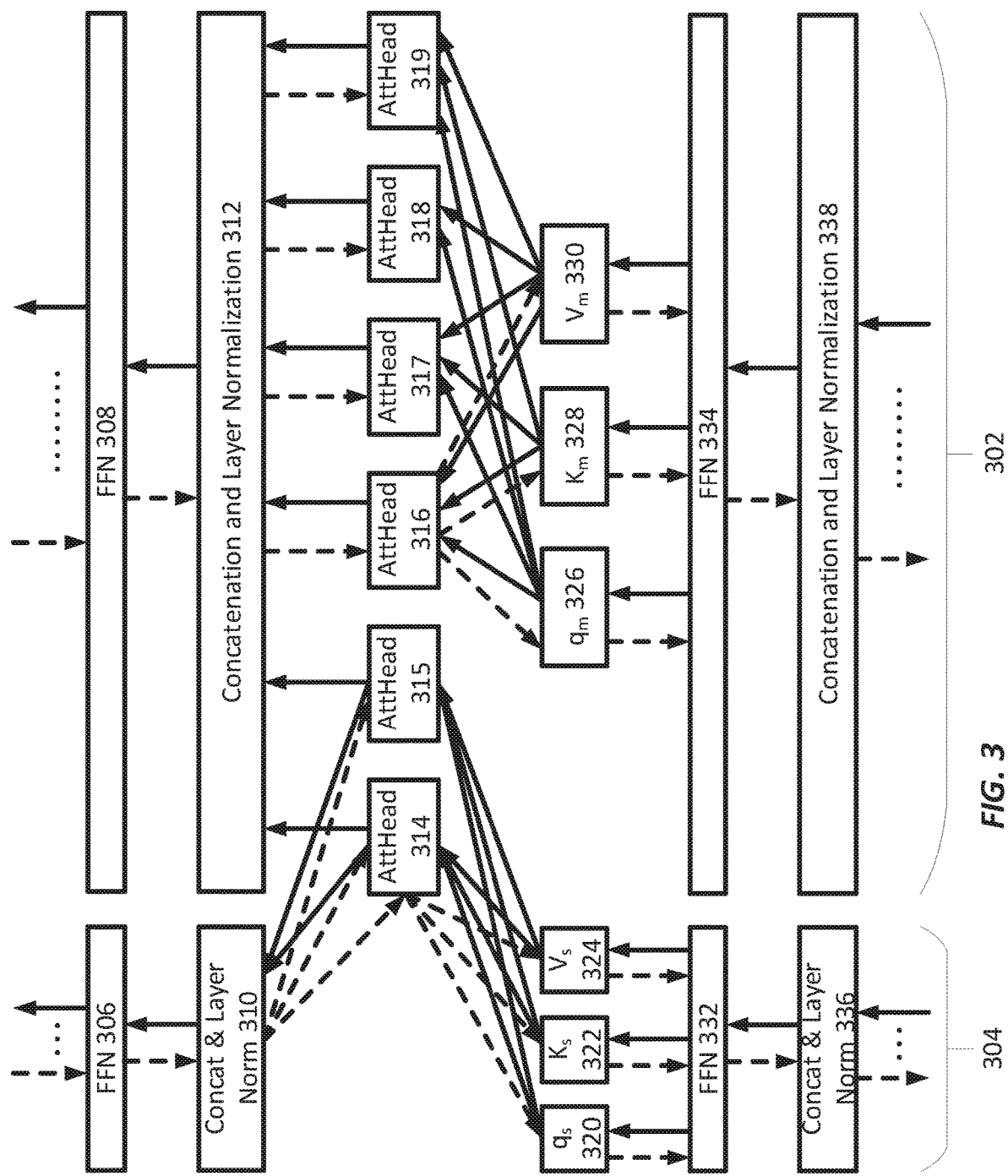
FIG. 3 is a block diagram of a forward and backward pass of the PSP++ module on a lower level of the neural network model, according to some embodiments.

FIG. 3 is a block diagram 300 illustrating the forward and backward pass of the PSP++ module on one of the lower layers of the base model, according to some embodiments. The right side 302 of the layer is associated with main model 202 and the left side 304 of the layer is associated with the held-out model 204. The held-out model 204 has a separate concatenation and layer normalization 336 and feed forward network 332 as inputs to the illustrated network portion, as well as separate concatenation and layer normalization 310 and feed forward network 306 as outputs which feed to the next stage. The main model 202 has a separate concatenation and layer normalization 338 and feed forward network 334 as inputs to the illustrated network portion, as well as separate concatenation and layer normalization 312 and feed forward network 308 as outputs which feed to the next stage. The solid arrows represent forward pass and the dotted arrows represent backward pass. For ease of the illustration, some dotted arrows may be omitted from some attention heads (AttHead) to their inputs. The dimensions of individual AttHeads of both the held-out model 204 and main models 202 are the same while the hidden dimension d, of the held-out model 204 is smaller than d, the hidden dimension of the main model 202.

The held-out model 204's self-attention heads 314 and 315 receive the outputs from its previous layer in the held-out model 204 and $q_s$ 320, $K_s$ 322, and $V_s$ 324 as inputs. The outputs of the AttHeads 314 and 315 of the held-out model 204 are forwarded to both the main model 202 and held-out model 204, while only the held-out model 204 receives the output of Attheads 314 and 315 in the backward pass of the held-out model 204. The main model 202's self-attention heads 316-319 receive the outputs from its previous layer in the main model 202 and $q_m$ 326, $K_m$ 328, and $V_m$ 330 as inputs. The outputs of the AttHeads 316-319 of the main model 202 are forwarded to the main model 202 concatenation and layer normalization 312. The main model 202 receives the output of Attheads 316-319 in the backward pass of the main model 202.

Figure 4:
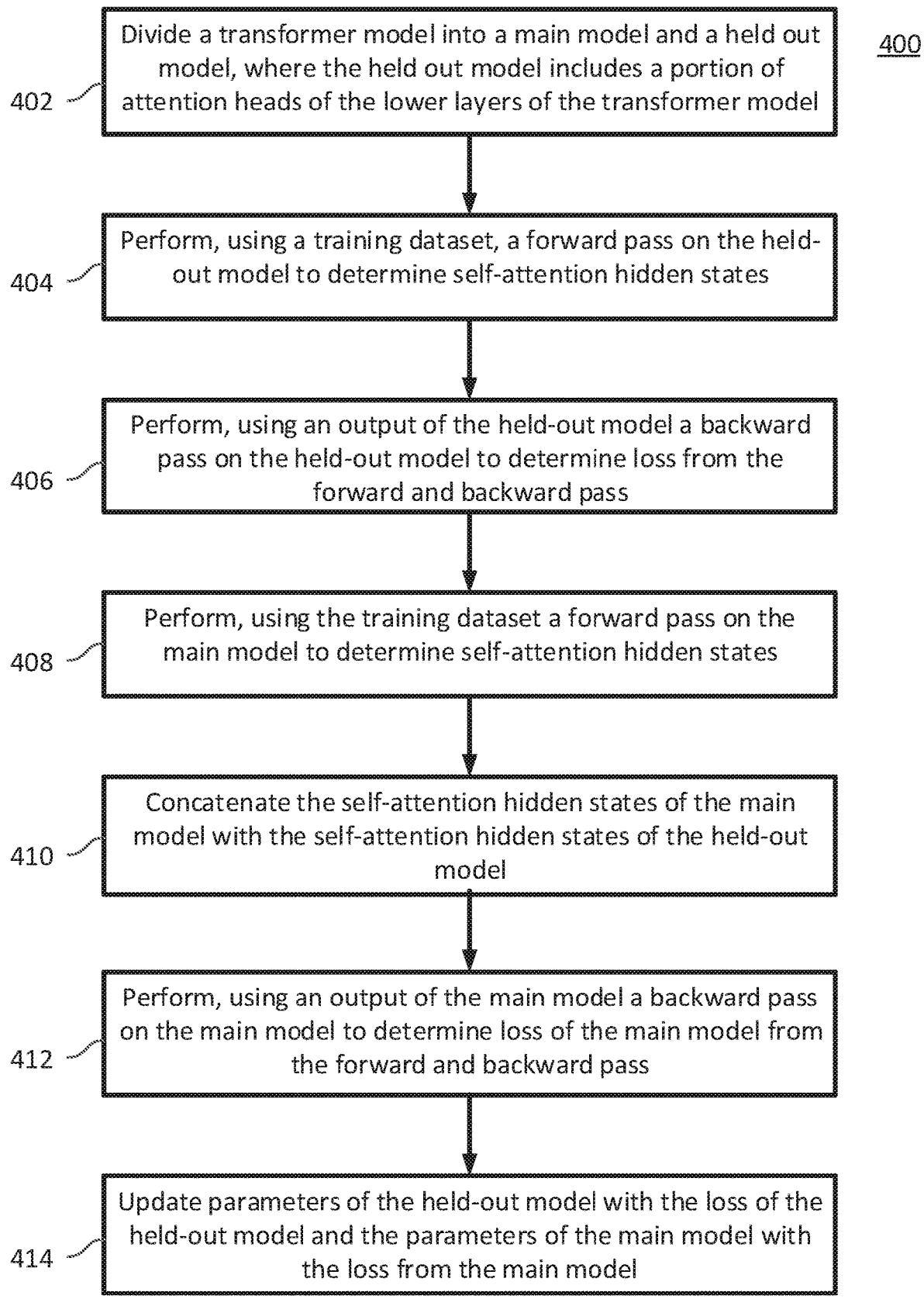
FIG. 4 is a flowchart of a method for training the neural network model using a PSP++ module, according to some embodiments.

FIG. 4 is a simplified flowchart of a method 400, according to some embodiments. One or more of the processes 402-414 of method 400 may be implemented, at least in part, in the form of executable code stored on non-transitory, tangible, machine-readable media that when run by one or more processors may cause the one or more processors to perform one or more of the processes 402-414.

At process 402, a model is received. For example, PSP++ module 130 receives a neural network model, such as transformer model 140 for pre-training. Transformer model 140 may have multiple transformer layers. PSP++ module 130 may divide transformer model 140 into main model 202 and held-out model 204, where the dimensions of the held-out model 204 are less than the dimensions of main model 202. For example, the held-out model 204 may have fewer layers than main model 202 and also have fewer parameters that main model 202 within the shared layers. In this way, held-out model 204 includes fewer parameters than main model 202. In some embodiments, held-out model 204 includes a portion of the attention heads and parameters from the lower layers of transformer model 140.

At process 404, a forward pass on the held-out model is performed. For example, PSP++ module 130 performs a forward pass on the held-out model 204 to determine the self-attention hidden states of the held-out model 204 on the forward pass. The forward pass may be made using training dataset 150.

At process 406, a backward pass on the held-out model is performed to determine loss. For example, PSP++ module 130 performs a backward pass on the held-out model 204 to determine loss on the data in the training dataset 150.

At process 408, a forward pass on the main model is performed. For example, PSP++ module 130 performs a forward pass on the main model to determine the self-attention hides states of the main model 202. The forward pass may be determined using training dataset 150. Although not shown, process 408 may be in parallel with process 406.

At process 410, the self-attention hidden states of the held-out model 204 determined in process 404 are concatenated with the self-attention hidden states of the main model 202 determined in process 408 for the lower levels of the main model. Process 410 may occur during the forward pass discussed in process 408.

At process 412, the backward pass on the main model is performed. For example, PSP++ module 130 performs a backward pass on the main model 202 to determine loss on the data in the training dataset 150 from the forward and backward pass of the main model. Although not shown, process 412 may be in parallel with process 408.

At process 414, parameters of the held-out model are updated with the loss of the held-out model 204 and the parameters of the main model are updated with the loss from the main model 202.

In some embodiments, processes 404-414 are performed for each level of transformer model 140, with the output of current layer being propagated into subsequent layers. For the layers of the main model 202 that are above the held-out model, process 410 may not be performed.

Exemplary experiments were conducted to evaluate performance of the PSP++ module with respect to efficiency and effectiveness by fine-tuning pre-trained base models from PSP++ and comparing with their backbone methods on downstream tasks. Experiments were also conducted on different hyper-parameter combinations.

PSP++ module 130 was implemented to train two pre-trained models, BERT and ELECTRA. An English Wikipedia corpus and a Book-Corpus datasets were used for the pre-training data. The pre-trained models were fine-tuned on GLUE, SuperGLUE, and SQuAD 2.0 datasets to evaluate the performance of the pre-trained models. Several natural language tasks were evaluated for each of the fine-tuned models including question answering, word sense disambiguation, and causal reasoning.

FIG. 5 illustrates a table 500 of performances of PSP++ on downstream tasks compared to baseline methods. PSP++ consistently outperforms its backbone methods on MNLI, average GLUE score, average SuperGLUE score and SQuAD 2.0's F1 and EM. This is accomplished even with smaller total parameter sizes, with BERT-PSP++'s total parameter size 24 M smaller than the original BERT and ELECTRA-PSP++'s parameter size 6 M smaller that ELECTRA. As the held-out model 204 is trained in parallel with the main model 202, and that total parameter size is reduced, the training time of PSP++ pre-training is similar and even slightly shorter than that of the corresponding backbone method. Alternatively, the held-out model may be trained first and then either fixed or allowed to train further in parallel with the main model.

Figure 6:
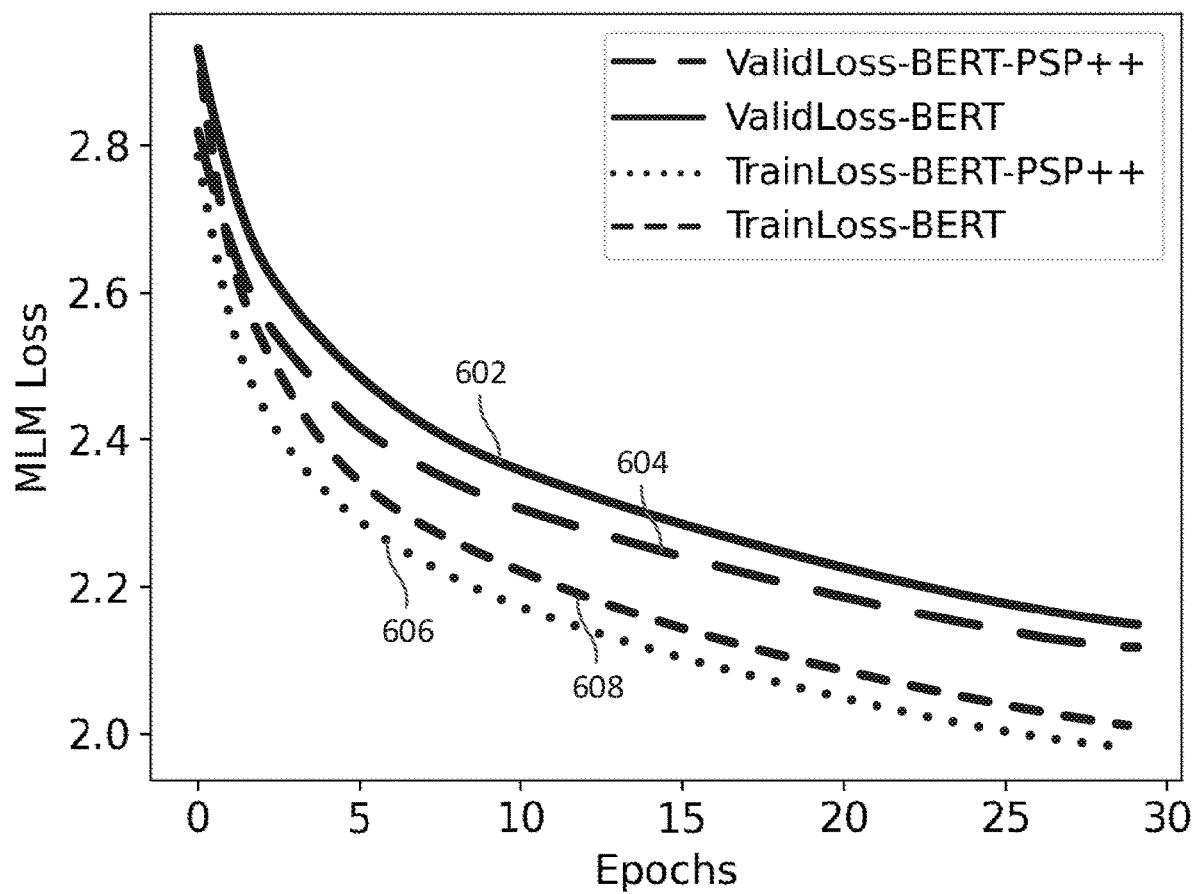
FIG. 6 is a chart of loss curves over several epochs.

FIG. 6 illustrates a chart 600 of train and validation loss curves compared with BERT. The charted losses of BERT-PSP++ are the main model's MLM loss. As is illustrated, the train and validation loss of BERT-PSP++ is constantly lower than those of BERT throughout the entire pre-training. Curve 604 which represents the validation loss of BERT-PSP++ is lower than curve 602 which represents the validation loss of BERT without PSP++. Curve 606 which represents the pre-training loss of BERT-PSP++ is lower than curve 608 which represents the pre-training loss of BERT without PSP++. The larger gap between PSP++ and BERT's loss curves at early phase is possibly due to the fact that the held-out model fits training data faster in the early phase, therefore can better expedite pre-training in the early phase. Chart 600 shows that PSP++ can make pre-training more efficient and less energy consuming.

Figure 7:
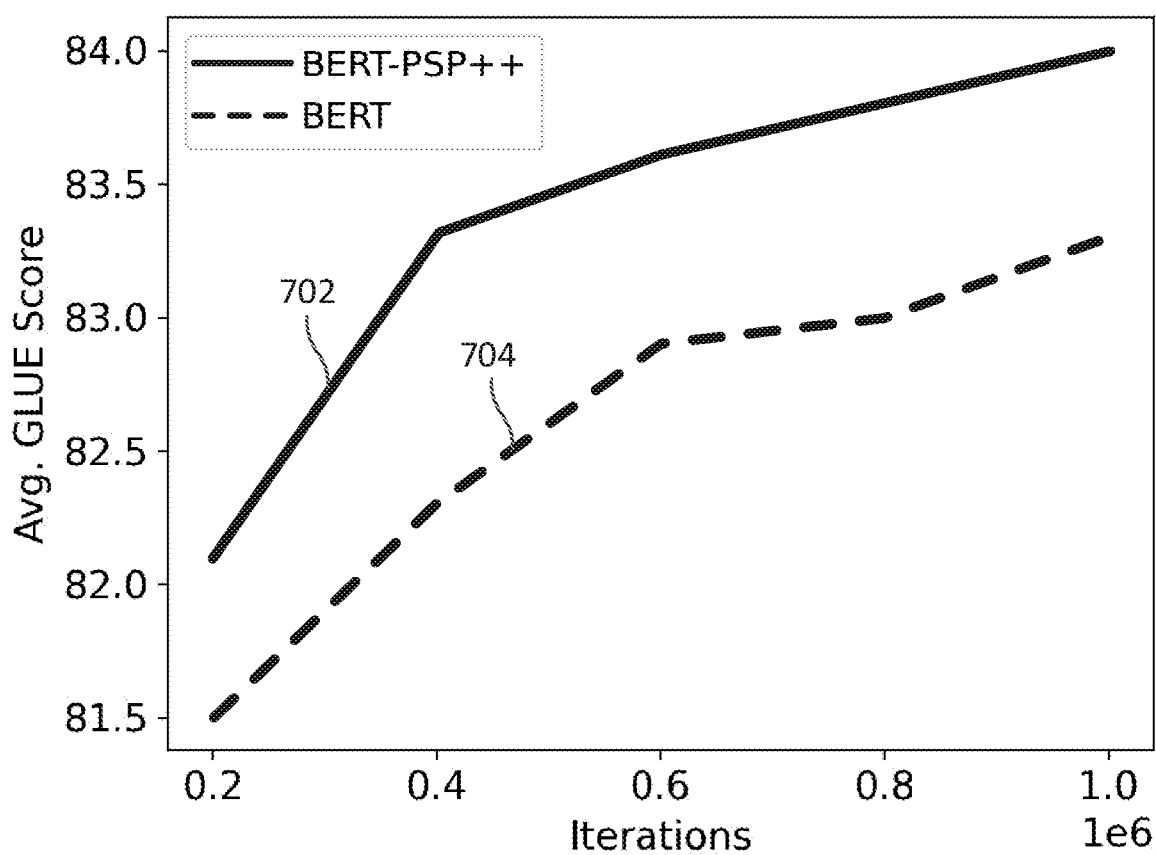
FIG. 7 is a chart of average GLUE scores over several iterations.

FIG. 7 illustrates a chart 700 of average GLUE scores over several iterations for both BERT and BERT-PSP++. Curve 702 which represents the GLUE score of BERT-PSP++ is consistently higher than curve 704 which represents the GLUE score of BERT without PSP++. This shows that in addition to converging more efficiently, better results can be achieved with the same number or potentially fewer parameters when using PSP++.

PSP++ adds at least two extra hyper-parameters, the number of layers of the held-out model and the number of attention heads at each layer of the held-out model. Experiments showed that if the held-out model gets too big, PSP++'s performance would be worse than baseline. Having too small of a held-out model also leads to worse performance because the held-out model's capacity is too weak to conduct normal pre-training. In general, a "short" and "fat" held-out model leads to better performance. The reason behind this phenomenon could be that the easy-to-fit information captured by the held-out model can help the upper layers of the main model to fit and understand more sophisticated patterns. A system may optimize these hyper-parameters in order to achieve optimal results.

One extension of PSP++ is to add a distillation loss on top of it during pre-training. The distillation loss can distill knowledge learned in the main model to the held-out model so that the main model can have more capacity to learn new patterns.

Some examples of computing devices, such as computing device 100 may include non-transitory, tangible, machine readable media that include executable code that when run by one or more processors (e.g., processor 110) may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for pre-training a transformer model, the method comprising:
dividing the transformer model stored in memory into a held-out model and a main model, wherein the held-out model comprises attention heads of the transformer model from a portion of a predefined number of lower layers of the transformer model;
performing, using a training dataset, a forward pass on the held-out model, the forward pass determines self-attention hidden states of the held-out model at corresponding layers in the predefined number of lower layers;
performing, using the training dataset, a forward pass on the main model, wherein the forward pass comprises:
determining self-attention hidden states of the main model at a corresponding layer;
concatenating the self-attention hidden states of the main model at the corresponding layer with the self-attention hidden states of the held-out model at the corresponding layer, wherein the concatenated self-attention hidden states are inputs to a layer subsequent to the corresponding layer of the main model;
performing, a backward pass on the held-out model, the backward pass determines a loss of the held-out model;
performing, a backward pass on the main model, the backward pass determines a loss of the main model; and
updating parameters of the held-out model based on the loss of the held-out model and parameters of the main model based on the loss of the main model.

2. The method of claim 1, wherein a parameter size of the held-out model is smaller than a parameter size of the main model.

3. The method of claim 1, wherein the predefined number of lower layers of the transformer model is less than a total number of layers in the transformer model.

4. The method of claim 1, further comprising:
adjusting a quantity of layers of the held-out model and a quantity of attention heads at each layer of the held-out model.

5. The method of claim 1, further comprising:
dividing the held-out model into a plurality of held-out models, wherein a first held-out model has fewer parameters than a second held-out model in the plurality of held-out models.

6. The method of claim 5, further comprising:
updating parameters of each of the plurality of held-out models based on a respective loss of the plurality of held-out models.

7. The method of claim 1, wherein the held-out model includes a first portion of the predefined number of lower layers and the main model includes a second portion of the predefined number of lower layers.

8. A system for pre-training a transformer model, the system comprising:
a non-transitory memory; and
one or more processor coupled to the non-transitory memory and configured to read instructions from the non-transitory memory to cause the system to perform operations comprising:
dividing the transformer model stored in memory into a held-out model and a main model, wherein the held-out model comprises attention heads of the transformer model from a portion of a predefined number of lower layers of the transformer model;
performing, using a training dataset, a forward pass on the held-out model, the forward pass determines self-attention hidden states of the held-out model at corresponding layers in the predefined number of lower layers;
performing, using the training dataset, a forward pass on the main model, wherein the forward pass comprises:
determining self-attention hidden states of the main model at a corresponding layer;
concatenating the self-attention hidden states of the main model at the corresponding layer with the self-attention hidden states of the held-out model at the corresponding layer, wherein the concatenated self-attention hidden states are inputs to a layer subsequent to the corresponding layer of the main model;
performing, a backward pass on the held-out model, the backward pass determines a loss of the held-out model;
performing, a backward pass on the main model, the backward pass determines a loss of the main model; and
updating parameters of the held-out model based on the loss of the held-out model and parameters of the main model based on the loss of the main model.

9. The system of claim 8, wherein a parameter size of the held-out model is smaller than a parameter size of the main model.

10. The system of claim 8, further comprising:
adjusting a quantity of layers of the held-out model and a quantity of attention heads at each layer of the held-out model.

11. The system of claim 8, further comprising:
dividing the held-out model into a plurality of held-out models, wherein a first held-out model has fewer parameters than a second held-out model in the plurality of held-out models.

12. The system of claim 11, further comprising updating parameters of each of the plurality of held-out models based on a respective loss of the plurality of held-out models.

13. The system of claim 8, wherein the held-out model includes a first portion of the predefined number of lower layers and the main model includes a second portion of the predefined number of lower layers.

14. The system of claim 8, wherein the predefined number of lower layers of the transformer model is less than a total number of layers in the transformer model.

15. A non-transitory, machine-readable medium having stored thereon machine-readable instructions executable to cause a system to perform operations comprising:
dividing the transformer model stored in memory into a held-out model and a main model, wherein the held-out model comprises attention heads of the transformer model from a portion of a predefined number of lower layers of the transformer model;
performing, using a training dataset, a forward pass on the held-out model, the forward pass determines self-attention hidden states of the held-out model at corresponding layers in the predefined number of lower layers;
performing, using the training dataset, a forward pass on the main model, wherein the forward pass comprises:
determining self-attention hidden states of the main model at a corresponding layer;
concatenating the self-attention hidden states of the main model at the corresponding layer with the self-attention hidden states of the held-out model at the corresponding layer, wherein the concatenated self-attention hidden states are inputs to a layer subsequent to the corresponding layer of the main model;

performing, backward passes on the held-out model and the main model, the backward pass determine a loss of the held-out model and a loss of the main model; and updating parameters of the held-out model based on the loss of the held-out model and parameters of the main model based on the loss of the main model.

16. The non-transitory, machine-readable medium of claim 15, wherein a parameter size of the held-out model is smaller than a parameter size of the main model.

17. The non-transitory, machine-readable medium of claim 15, further comprising:

adjusting a quantity of layers of the held-out model and a quantity of attention heads at each layer of the held-out model.

18. The non-transitory, machine-readable medium of claim 15, further comprising dividing the held-out model into a plurality of held-out models, wherein a first held-out model has fewer parameters than a second held-out model in the plurality of held-out models.

19. The non-transitory, machine-readable medium of claim 18, further comprising updating parameters of each of the plurality of held-out models based on a respective loss of the plurality of held-out models.

20. The non-transitory, machine-readable medium of claim 15, wherein the held-out model includes a first portion of the predefined number of lower layers and the main model includes a second portion of the predefined number of lower layers.

* * * * *